United States Patent Office 2,702,241
Patented Feb. 15, 1955

2,702,241
GLASS FIBER MATERIAL

Don M. Hawley, Geneva, and John C. Williams, St. Charles, Ill., assignors to Hawley Products Company, St. Charles, Ill., a corporation of Delaware No Drawing. Application October 7, 1950,
Serial No. 189,040

9 Claims. (Cl. 92—3)

This invention relates to a glass fiber material, to a method for the manufacture thereof and to the manufacture of wet processed articles therefrom.

One form of glass fiber material now available consists of continuous glass filaments twisted together in a thread-like form. These thread-like twisted glass filament materials are extremely strong when pulled longitudinally but readily break when bent at right angles to the axis of the fibers due to the brittleness of the glass.

When these thread-like twisted glass filament materials are cut and placed in water they tend to fall apart into fine glass fibers. We have prepared such glass fiber materials in an aqueous slurry alone and with other fibers such as cellulose and have attempted to prepare from the resultant slurry thin pads or sheets of such fibrous materials in which glass fibers are present. These attempts have not resulted in the satisfactory production of thin pads or sheets by any wet processing methods heretofore used, particularly in that impact and tear strengths contributed by the glass threads are lost to a large extent when they separate in the water.

We have discovered that one difficulty apparently lies in the tendency of the glass fibers to fall apart in water.

One object of the invention is to provide aqueous slurries in which twisted glass filaments are present in such form that they do not fall apart.

Another object of the invention is to provide a new method of combining glass fibers with other types of fibers in order to produce new and improved sheet materials as well as new and improved molded products by wet processing methods.

Another object of the invention is to provide new and useful mixed fiber compositions and products in which glass fibers are a component. Other objects will appear hereinafter.

In accordance with this invention, we have found that glass fibers twisted together can be employed in aqueous slurries to form sheets and molded articles and can be combined with other fibrous materials such as cellulose in such slurries by coating continuous strands of bundles of glass filaments before they are cut with a material which adheres to the glass and does not disperse in water. If the coating is applied from an aqueous solution the continuous strands of bundles of glass filaments containing the applied coating should be dried, then chopped and added to water to form an aqueous slurry.

The glass fiber bundles may also be sprayed or dipped with the resinous binder while in chopped form, in bats or as glass cloth.

The material which is applied to the bundles of glass filaments is preferably a composition consisting essentially of polyvinyl acetate and a plasticizer (e. g., tricresyl phosphate, dibutyl phthalate, etc.). A suitable material is a plasticized polyvinyl acetate sold under the trade name Elvacet 83–1200 (Du Pont). This should be well baked out, e. g., 20 minutes at 300 degrees F. to give adequate insolubility of the resin.

Another suitable material is a polyvinyl acetate dispersion sold under the name Vinylseal W–125 (Carbide & Carbon Chemicals Corporation) diluted from its normal consistency of about 52% total solids to 25% total solids.

Certain types of rubbery materials do not stick to glass and hence are unsuitable for the purpose of the present invention. However, these materials can be employed in conjunction with other substances which increase their adherence to glass. For example, in the practice of the invention a continuous strand of twisted glass filaments can be passed through a composition prepared by mixing 100 parts by weight of Hycar OR–25, 100 parts of a 25% solution of a water dispersible phenolic resin such as Synco 421 and 200 parts of water.

After the continuous strand has been passed through the aforesaid composition it is squeezed dry and the phenolic resin is cured to water insoluble form by heating for 15 minutes at 300 degrees F. The Hycar OR–25 is a butadiene-acrylonitrile synthetic rubber latex made by B. F. Goodrich Company and having a solids content of approximately 40%. The Synco 421 is a synthetic phenolic resin made by Snyder Chemical Company, Bethel, Conn. Without the phenolic resin, the rubber latex would not adhere properly to the glass filaments.

Thermosetting polyester resins suitably catalyzed and diluted may be employed. For example, 1000 grams of glass thread, cut to one inch lengths was sprayed with 100 grams of Selectron 5003 (Pittsburgh Plate Glass Co.) catalyzed with 1 gram of benzoyl peroxide and diluted with 300 grams of ethyl acetate. After allowing the solvent to evaporate, this was baked at 300 degrees F. for 20 minutes to harden the resin. The mass was then put through a "picker" to separate the threads and slurried with cellulose fibers for use.

The example was repeated substituting a varnish made from a butylated melamine 100 (245–8 American Cyanamid Co.) and raw castor oil 20 for the polyester resin.

Still another type of coating composition which may be applied is a regenerated cellulose.

The coating material is applied to the bundles of glass filaments either by immersion, spraying or in any other suitable manner. In the case of the regenerated cellulose coating a cellulose xanthate or other regeneratable cellulose solution is applied to the bundles of glass filaments and then regenerated in situ. This is accomplished first by passing the twisted glass filaments through a cellulose xanthate or cuprammonium cellulose solution and then through a regenerating solution.

The quantity of the coating material applied to the bundles of glass filaments should be such that the glass fibers do not fall apart in water. Good results have been obtained by employing approximately an equal weight of bundles of glass filaments and a coating material, for example, Vinylseal W–125. An excess of the coating material should be avoided because it makes the bundles of glass filaments too stiff. A much lower quantity can be used, for example, 10% by weight of the coating material, such as Vinylseal W–125, based on the weight of the bundles of glass filaments.

The bundles of glass filament material which have been coated in accordance with the present invention can be cut or chopped into short lengths (say averaging one-half inch) and used for air felting. However, the invention is primarily concerned with wet processing wherein the coated bundles of glass filament material are cut and added to water to form a slurry. The aqueous slurry of the coated bundles of glass filament material can be beaten to the desired freeness and then can be felted into sheets as in paper making or can be molded by accreting it from the aqueous slurry onto a porous former.

In accretion molding, the fiber and water slurry is accreted onto a porous former according to well known methods which are described in detail in numerous patents, for example, U. S. 1,872,583 and U. S. 1,952,168. Since the particular method of accretion molding is well known, it is not deemed necessary to describe the method and apparatus in great detail here.

As previously indicated, an important feature of the invention is the combination of the coated bundles of glass filament material with other types of fibers such as cellulosic fiber. When the coated bundles of glass filament material are combined with the other types of fibers the quantity of the glass used is preferably within the range of 5% to 35% by weight of the total fiber content.

One example of a combination of fibers suitable for the practice of the invention is a composition consisting of ⅓ coated twisted glass filaments
⅓ ground wood
⅓ northern kraft, the proportions being given in parts by weight.

The foregoing type of composition is especially useful in the manufacture of accreted molded fibrous products produced either as preforms or as finished articles. This composition can also be used in the manufacture of paper in which case, however, the proportion of coated bundles of glass filaments is preferably reduced. The quantity of the coating substance should be insufficient to destroy the flexibility of the twisted glass filaments.

In some cases, as in the manufacture of paper, it is desirable to employ both the coated bundles of glass filaments which do not come apart in water and bundles of glass filaments which come apart in water. The latter assist in binding the other fibers together. A typical composition containing both kinds of glass filaments is, for example, ⅓ coated twisted glass filaments
⅓ northern kraft
⅙ ground wood pulp
⅙ water dispersible glass fibers, the proportions being given in parts by weight.

The quantity of fibrous solids present in the aqueous slurry is varied depending upon the type of article formed therefrom. For making paper sheets the fibrous solids are preferably approximately 0.5% by weight of the slurry, the remaining 99.5% being water. For making accreted shaped articles on porous formers, a satisfactory dispersion contains from about ½ to 2% of total fiber on the weight of the water.

It will be recognized that the invention is applicable to the employment of bundles of glass filaments in conjunction with many different types of fibrous materials including, for example, kraft, wool, hennequen, hemp, sisal, cotton and nylon.

As will be apparent the invention provides new and useful products composed of hydratable fibers such as cellulose and non-hydratable glass fibers. Not only flat sheets but also molded products such as portable typewriter cases, projector cases, radio, television and phonograph cabinets and housings, drawers, baby buggy bodies, sleds, hobby horses, and luggage can be made from the products of the invention.

The invention is particularly valuable in providing radio speaker diaphragms of improved dimensional stability and tonal quality.

In accreted filter formation the resin bound glass threads are adapted to give bulky mats which dry easily in manufacturing and which are resistant to corrosive materials in use.

The invention is hereby claimed as follows:

1. The method of forming articles containing individual thread-like bundles of glass filaments which comprises dispersing individual cut flexible thread-like bundles of glass filaments in water to form an aqueous slurry, said bundles each being coated with a quantity of a water insoluble adherent coating material sufficient to prevent the cut bundles from separating into individual filaments in said slurry but insufficient to destroy the flexibility of said bundles, and felting an article from said aqueous slurry.

2. The method of forming articles containing individual thread-like bundles of glass filaments which comprises dispersing individual cut flexible thread-like bundles of glass filaments in water to form an aqueous slurry, said bundles each being coated with a quantity of a water insoluble adherent coating material sufficient to prevent the cut bundles from separating into individual filaments in said slurry but not substantially greater by weight than the weight of the glass filaments in said bundles.

3. The method of forming articles containing individual thread-like bundles of glass filaments which comprises dispersing individual cut flexible thread-like bundles of glass filaments in water to form an aqueous slurry, said bundles each being coated with a quantity of a water insoluble adherent coating material, the quantity of said coating material being at least 10% by weight but not substantially greater by weight than the weight of the glass filaments in said bundles, and felting an article from said aqueous slurry.

4. The method of forming articles containing individual thread-like bundles of glass filaments which comprises precoating flexible thread-like bundles of glass filaments with an adherent water insoluble coating material, subsequently cutting said precoated bundles into short lengths and dispersing said short lengths of precoated bundles of glass filaments in sufficient water to form an aqueous slurry of felting consistency, and felting an article from said aqueous slurry, the quantity of said water insoluble coating material being sufficient to prevent said bundles of glass filaments from coming apart into fine glass fibers in said slurry but not substantially greater than the weight of the glass filaments in said glass filament bundles.

5. The method of forming articles containing individual thread-like bundles of glass filaments which comprises dispersing individual cut flexible thread-like bundles of glass filaments in water together with hydratable fibers to form an aqueous slurry containing non-hydratable cut bundles of glass filaments dispersed with hydratable fibers, said bundles each being coated with a quantity of a water insoluble adherent coating material sufficient to prevent the cut bundles from separating into individual filaments in said slurry but insufficient to destroy the flexibility of said bundles, and felting an article from said aqueous slurry.

6. The method of forming articles containing individual thread-like bundles of glass filaments which comprises dispersing individual cut flexible thread-like bundles of glass filaments in water together with hydratable fibers to form an aqueous slurry containing non-hydratable cut bundles of glass filaments dispersed with hydratable fibers, said bundles each being coated with a quantity of a water insoluble adherent coating material, the quantity of said coating material being at least 10% by weight of said glass filaments in said bundles but not substantially greater by weight than the weight of the glass filaments in said bundles, and felting an article from said aqueous slurry.

7. The method of making articles containing individual thread-like bundles of glass filaments which comprises dispersing individual cut flexible thread-like bundles of glass filaments in water together with hydratable fibers to form an aqueous slurry containing non-hydratable cut thread-like bundles of glass filaments dispersed with hydratable fibers, said bundles each being coated with 10% to 50% by weight of the glass filaments of a water insoluble adherent coating material, the quantity of said cut bundles of glass filaments being within the range of 5% to 35% by weight of the total of such glass filament and hydratable fiber content of said slurry, and felting an article from said aqueous slurry.

8. The method of making articles containing individual thread-like bundles of glass filaments which comprises dispersing individual cut flexible thread-like bundles of glass filaments in water together with hydratable cellulose fibers to form an aqueous slurry containing non-hydratable cut thread-like bundles of glass filaments dispersed with hydratable cellulose fibers, said bundles each being coated with 10% to 50% by weight of the glass filaments of a water insoluble adherent coating material, the quantity of said cut bundles of glass filaments being within the range of 5% to 35% by weight of the total of such glass filament and hydratable cellulose fiber content of said slurry, and felting an article from said aqueous slurry.

9. The method of forming articles containing individual cut thread-like bundles of glass filaments which comprises coating continuous strands composed of bundles of glass filaments with an adherent water insoluble coating material, cutting the coated bundles into short lengths, dispersing said coated bundles of glass filaments in water to form an aqueous slurry, and felting an article from said aqueous slurry, the quantity of said water insoluble coating material being at least 10% but not more than 50% by weight of the glass filaments in said glass filament bundles.

References Cited in the file of this patent

UNITED STATES PATENTS

| | | |
|---|---|---|
| 1,226,779 | Lappen | May 22, 1917 |
| 1,972,493 | Powell | Sept. 4, 1934 |
| 2,225,100 | Clapp | Dec. 17, 1940 |
| 2,230,272 | Slayter | Feb. 4, 1941 |
| 2,237,745 | Musgrave | Apr. 8, 1941 |
| 2,344,733 | Ripper | Mar. 21, 1944 |
| 2,354,110 | Ford et al. | July 18, 1944 |
| 2,457,775 | Ebaugh | Dec. 28, 1948 |
| 2,459,804 | Francis | Jan. 25, 1949 |
| 2,469,409 | Powers et al | May 10, 1949 |
| 2,477,555 | Roberts et al. | July 26, 1949 |
| 2,504,744 | Sproull | Apr. 18, 1950 |
| 2,504,845 | Keyes | Apr. 18, 1950 |
| 2,554,934 | Ayers | May 29, 1951 |
| 2,611,718 | Steinman | Sept. 23, 1952 |

FOREIGN PATENTS

| | | |
|---|---|---|
| 497,059 | Great Britain | Dec. 8, 1938 |
| 113,887 | Australia | Oct. 2, 1941 |